United States Patent
Geranio

[19]
[11] Patent Number: 5,993,005
[45] Date of Patent: Nov. 30, 1999

[54] VIDEO WALL

[76] Inventor: Nicholas L. Geranio, 16461 Sherman Way, Suite 275, Van Nuys, Calif. 91406

[21] Appl. No.: 09/268,076

[22] Filed: Mar. 11, 1999

[51] Int. Cl.[6] .................................................. G03B 21/14
[52] U.S. Cl. .............................. 353/10; 353/94; 359/478
[58] Field of Search .................................. 353/10, 28, 30, 353/94, 74; 352/86; 359/458, 478, 479

[56] References Cited

U.S. PATENT DOCUMENTS

| | | | |
|---|---|---|---|
| 2,952,182 | 9/1960 | Marks et al. .............................. | 88/16.6 |
| 4,492,442 | 1/1985 | Gaudyn ..................................... | 353/10 |
| 4,509,837 | 4/1985 | Kassies ..................................... | 353/10 |
| 4,571,041 | 2/1986 | Gaudyn ..................................... | 353/10 |
| 4,671,625 | 6/1987 | Noble ...................................... | 359/478 |
| 5,255,028 | 10/1993 | Biles ........................................ | 353/7 |
| 5,257,130 | 10/1993 | Monroe ..................................... | 359/478 |
| 5,311,357 | 5/1994 | Summer et al. ......................... | 359/479 |
| 5,329,323 | 7/1994 | Biles ........................................ | 353/10 |
| 5,382,990 | 1/1995 | Hata et al. ............................... | 353/94 |
| 5,408,282 | 4/1995 | Nagashima ............................... | 353/77 |
| 5,467,154 | 11/1995 | Gale ........................................ | 353/119 |
| 5,508,763 | 4/1996 | Schulte ...................................... | 353/10 |
| 5,515,183 | 5/1996 | Hashimoto ................................. | 359/9 |
| 5,590,943 | 1/1997 | Yoshida ..................................... | 353/74 |
| 5,669,685 | 9/1997 | Kotani et al. .............................. | 353/28 |
| 5,767,993 | 6/1998 | Burney ..................................... | 359/32 |
| 5,782,547 | 7/1998 | Machtig et al. ............................ | 353/10 |
| 5,886,816 | 3/1999 | Faris ......................................... | 353/8 |
| 5,886,818 | 3/1999 | Summer et al. ........................... | 353/10 |

*Primary Examiner*—William Dowling
*Attorney, Agent, or Firm*—Eric Karich

[57] ABSTRACT

A video wall has a plurality of spatial object image display devices, each spatial object image display device including a luminous display screen for providing a first image. The luminous display screen is operably engaged with a video wall computer, which is operatively engaged with at least one video input device such as a video cassette recorder (VCR). The video wall computer acts as a splitter to distribute the output of the VCR to the plurality of spatial object image display devices. Each spatial object image display device also includes a lens operatively spaced apart from the luminous display screen for projecting the first image beyond the lens to appear as a first spatial object. The luminous display screen and the lens of each spatial object image display device are mounted within a housing that surrounds the luminous display screen and the lens, excluding substantially all light from within the housing, except through an aperture in the housing. The lens is operably mounted in proximity to and substantially covering the aperture, operably positioning the lens to project the first spatial object from the housing. The housing further includes a shroud extending from the perimeter of the aperture far enough to shield the lens, but not far enough to surround the first spatial object. All of the spatial object image display devices are covered with a semitransparent screen, and projector is positioned to project a second image onto the semitransparent screen, thereby forming a complex series of images that appear to be three-dimensional.

3 Claims, 2 Drawing Sheets

VIDEO WALL

BACKGROUND OF THE INVENTION

1. Field of the Invention

This invention relates generally to optical display devices that produce spatial objects, and more particularly to a video wall that produces complex layers of projected images that interact to create the appearance of a three-dimensional holographic display.

2. Description of Related Art

Optical display devices that image an object seemingly floating in space have been known for many years. The two most common methods of producing floating objects has been by either reflecting an object from one or more curved mirrors (i.e., parabolic) or viewing an object properly positioned behind one or more lenses. These methodologies are termed reflective or transmissive spatial object devices, respectively.

One means of providing a background image spatial object display is taught by Monroe (U.S. Pat. No. 5,257,130). In this disclosure, a scrim is used to permit a spatial object (produced by either reflective or transmissive means) to appear in front of the scrim (the optical rays forming the object having passed through the open mesh weave of the scrim). The scrim simultaneously serves as a front projection screen surface on which the background image can be projected.

Another means of providing a background image spatial object display is taught by Warren et al. (U.S. Pat No. 5,311,357). Warren discloses the use of two concave mirrors to produce a spatial object with one of the concave mirrors being partially transparent. Behind this partially transparent mirror is an image display which can be readily seen by an observer through the partially transparent concave mirror. Although this device does provide a spatial object floating before a background image, it suffers from several disadvantages. First, the partially transparent concave mirror is an excessively expensive custom optical component. Second, the curve of the partially transparent concave mirror visibly distorts the background image. Third, the background image, on a large screen display, is positioned far back into the device, creating the awkward necessity of peering into a black box. Finally, this device does not provide a means to enhance the 3-D appearance of the background image so that the background image always appears flat.

Still another background image spatial object display is taught by Noble (U.S. Pat. No. 4,671,625). This transmissive spatial object display utilizes a combination of convex lenses with improved viewing of the spatial object provided by a visible reference around the area in which he spatial object appears to serve as a visual cue for the observer. This visible reference is taught primarily as the edge of a box (i.e., shroud) that extends out from the closest convex lens to the observer. A background image is provided by reflecting the spatial object off a partially transparent mirror with the image behind in an optical arrangement similar to Warren, except that this partially transparent mirror is flat and is not used to create the spatial object. In Noble, the transmissive spatial object is created by a transmissive spatial object image produced by a transmissive object display (i.e., CRT). A first convex lens and a second convex lens manipulate the light rays to produce the transmissive spatial object. The transmissive spatial object is viewed from as the reflection of a partially transparent mirror. This mirror folds the beam of the transmissive spatial object and allows a background image (i.e., a poster or full motion display) to appear behind the partially transparent plane that enables the observer to comprehend the spatial position of the transmissive spatial object. As a result, the transmissive spatial object appears to float within the housing and does not protrude beyond the visible reference of the housing opening edges, where it would create a much greater visual impact. This visible reference operates in conjunction with an optional second visible reference located near the convex lens to assist the viewer in accurately aligning the object in space. Unfortunately, peering deep into this box to view the image is somewhat unnatural and may be an irritant to observers accustomed to interacting directly with a television screen or a computer monitor. Also, by recessing the image deep within a box, only a single observer at a time can peer into the box to view the image. As a result, this device is unable to communicate simultaneously with multiple observers. Noble also does not teach how to provide a background image behind these two spatial objects, nor does he offer a method of reducing the bulk of the display necessitated by two full sets of optics. Nor does he teach a method for reducing reflections on the first convex lens, other that the shroud. Also, the configuration he teaches requires both spatial objects to be contained within the box behind the edges of the box forming the transparent plane of the visible reference means.

Machtig et al. U.S. Pat. No. 5,782,547 describes an improved transmissive spatial object display that provides a background image that appears to observers to have 3-D depth and includes the added advantages of permitting several viewers to observe the display simultaneously so that the background image appears on an accessible screen like that of televisions and computer monitors. The background image display is observed directly through a first Fresnel lens of a two Fresnel lens transmissive spatial object display which lens magnifies the background image display and also provides the front screen of the device. A first partially transparent mirror at 45 degrees separates the two Fresnel lenses permitting the background image display to be viewed solely through the first Fresnel lens. The first Fresnel lens serves the dual function of creating a first spatial object (in combination with the second Fresnel lens) and magnifying the background image. The magnified background image appears through the first Fresnel lens creating a pseudo 3-D appearance even though the background image is generated by a 2-dimensional display such as a CRT. Video production techniques can enhance this illusion of dimensionality through isolation of objects and graphics on a black field and use of dimensionalizing techniques such as reflections and shadings. Alternate embodiments provide projection of multiple spatial objects. Additional embodiments are configured without the second Fresnel lens so that the first Fresnel lens serves to magnify the background display's image and by itself creates the first spatial object.

The prior art teaches a transmissive spatial object display that provides an image that appears to observers to project into space. However, the prior art does not teach an improved transmissive spatial object display that covers an entire wall and provides a complex and multilayered image that appears to observers to have 3-D depth. The present invention fulfills these needs and provides further related advantages as described in the following summary.

SUMMARY OF THE INVENTION

The present invention teaches certain benefits in construction and use which give rise to the objectives described below.

The present invention provides a video wall built formed by a plurality of spatial object image display devices. Each spatial object image display device includes a luminous display screen for providing a first image. The luminous display screen is operably engaged with a video wall computer, which is operatively engaged with at least one video input device such as a video cassette recorder (VCR). The video wall computer acts as a splitter to distribute the output of the VCR to the plurality of spatial object image display devices. Each spatial object image display device also includes a lens operatively spaced apart from the luminous display screen for projecting the first image beyond the lens to appear as a first spatial object. The luminous display screen and the lens of each spatial object image display device are mounted within a housing that surrounds the luminous display screen and the lens, excluding substantially all light from within the housing, except through an aperture in the housing. The lens is operably mounted in proximity to and substantially covering the aperture, operably positioning the lens to project the first spatial object from the housing. The housing further includes a shroud extending from the perimeter of the aperture far enough to shield the lens, but not far enough to surround the first spatial object. All of the spatial object image display devices are covered with a semitransparent screen, and projector is positioned to project a second image onto the semitransparent screen, thereby forming a complex series of images that appear to be three-dimensional.

A primary objective of the present invention is to provide a video wall having advantages not taught by the prior art.

Another objective is to provide a projection device that is capable of converting an ordinary television display into a multi-layered image with three-dimensional characteristics that covers an entire wall.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
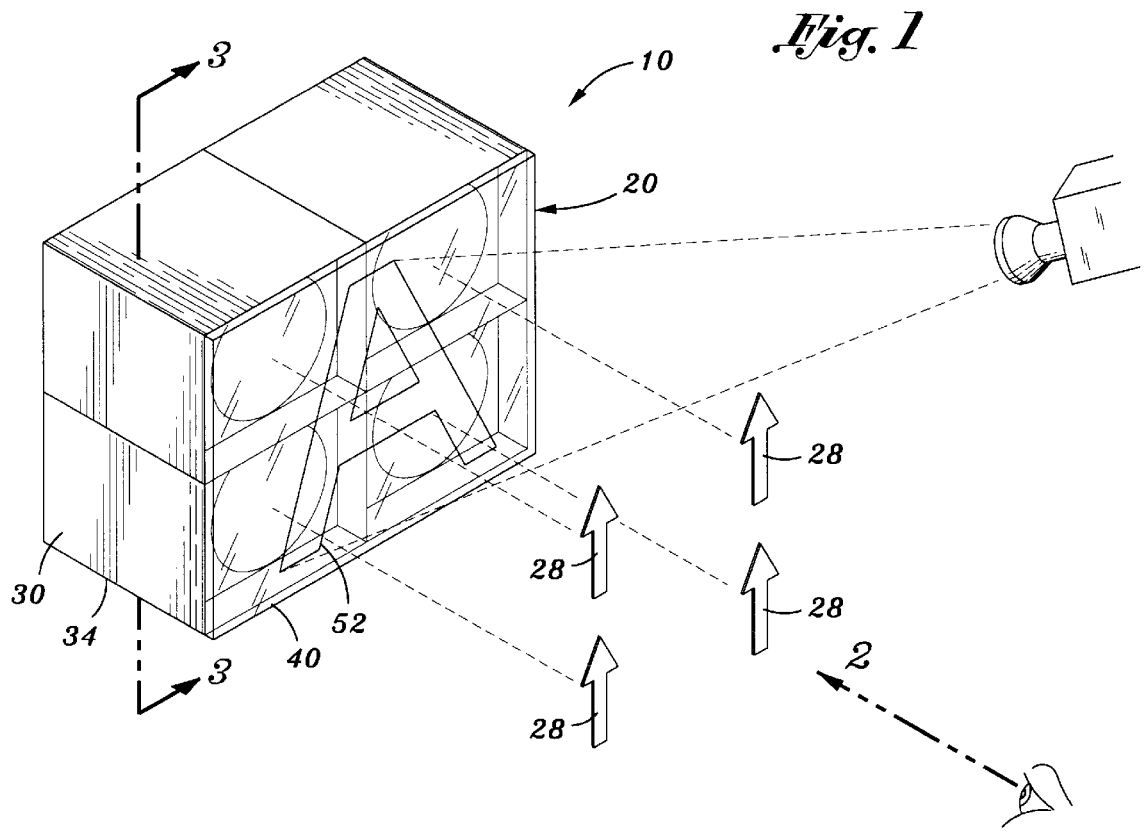
FIG. 1 is a perspective view of the preferred embodiment of the present invention.

The above described drawing figures illustrate the invention, a video wall 10 built formed by a plurality of spatial object image display devices 20. The plurality of spatial object image display devices 20, as shown in FIG. 1 and described more fully below, each operate to project a first spatial object 28. All of the spatial object image display devices 20 are covered with a semitransparent screen 40, as described below, to form the video wall 10. A projector 50 is positioned to project a second image 52 onto the semitransparent screen 40, thereby forming a complex series of images that appear to be three-dimensional.

Figure 3:
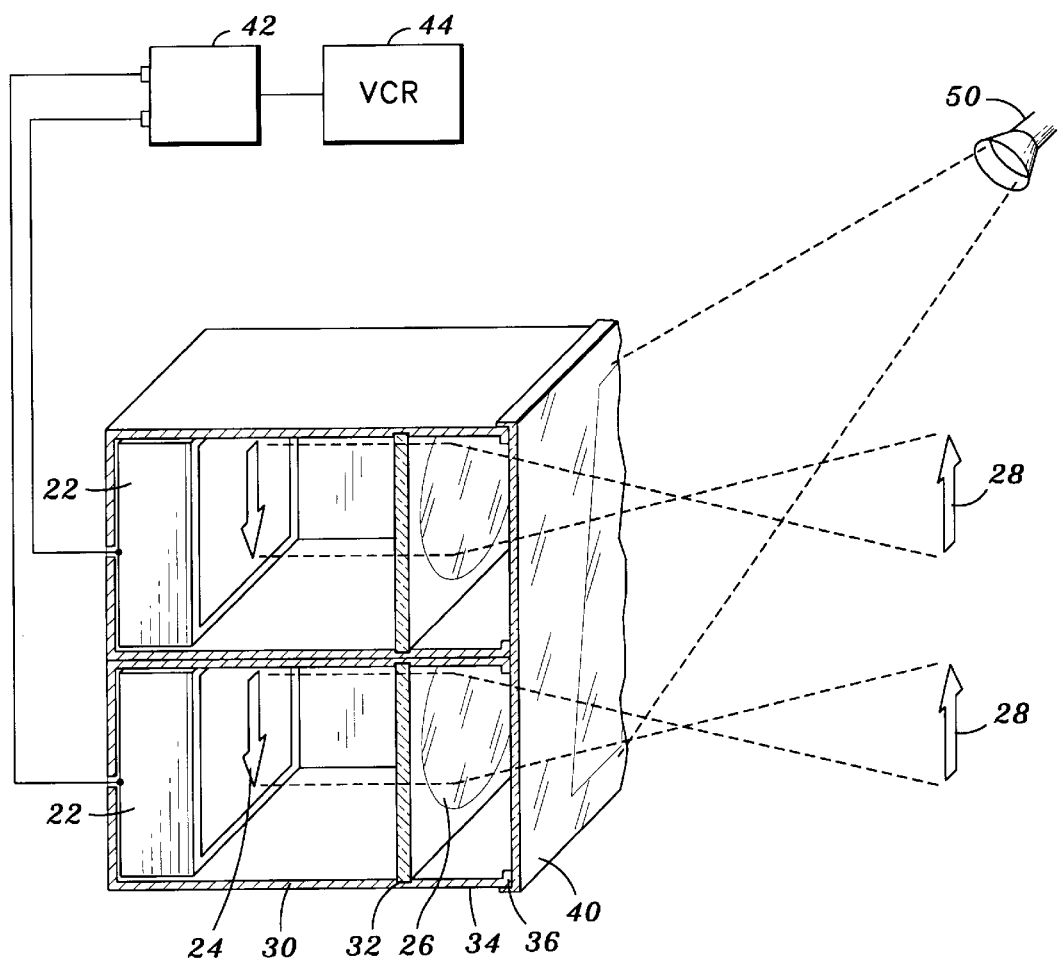
FIG. 3 is a sectional view thereof taken along line 3—3 in FIG. 1.

As shown in FIG. 3, each spatial object image display device 20 includes a luminous display screen 22 for providing a first image 24. The luminous display screen 22 is preferably a television (CRT) operably engaged with a video wall computer 42. The video wall computer 42 is operatively engaged with at least one video input device 44, preferably a video cassette recorder (VCR). The video wall computer 42 acts as a splitter to distribute the output of the VCR 44 to the plurality of spatial object image display devices 20. By inputting additional VCRs 44 into the video wall computer 42, additional images can be integrated into the output of the video wall 10. Such video manipulation and splitting is known to those skilled in the art. Each spatial object image display device 20 also includes a lens 26 operatively spaced apart from the luminous display screen 22 for projecting the first image 24 beyond the lens 26 to appear as a first spatial object 28. The lens 26 is convex, is preferably constructed as a Fresnel lens, and is similar to the lens 26 used in Machtig et al., U.S. Pat. No. 5,782,547, hereby incorporated in full by reference. The specific construction of the lens 26 will vary according to the desired specifications of each spatial object image display device 20; however, it is preferred that the lens 26 have a focal length that is as short as possible. The luminous display screen 22 and the lens 26 of each spatial object image display device 20 are mounted within a housing 30 that surrounds the luminous display screen 22 and the lens 26, excluding substantially all light from within the housing 30, except through an aperture 32 in the housing 30.

The lens 26 is operably mounted in proximity to and substantially covering the aperture 32, operably positioning the lens 26 to project the first spatial object 28 from the housing 30. The housing 30 further includes a shroud 34 extending from the perimeter of the aperture 32 far enough to shield the lens 26, but not far enough to surround the first spatial object 28. The position of the lens 26 within the aperture 32 and relative to the shroud 34 is critical. As shown in FIG. 3, the lens 26 must be positioned such that the shroud 34 extends beyond and shields the lens 26, but the first spatial object 28 is formed beyond the semitransparent screen 40. The shroud 34 terminates in a lip 36 that supports the front face of the video wall 10. The focal length of the lens 26 must be such that the first spatial object 28 is projected in front of and interacts well with the second image 52 projected onto the transparent screen.

Figure 2:
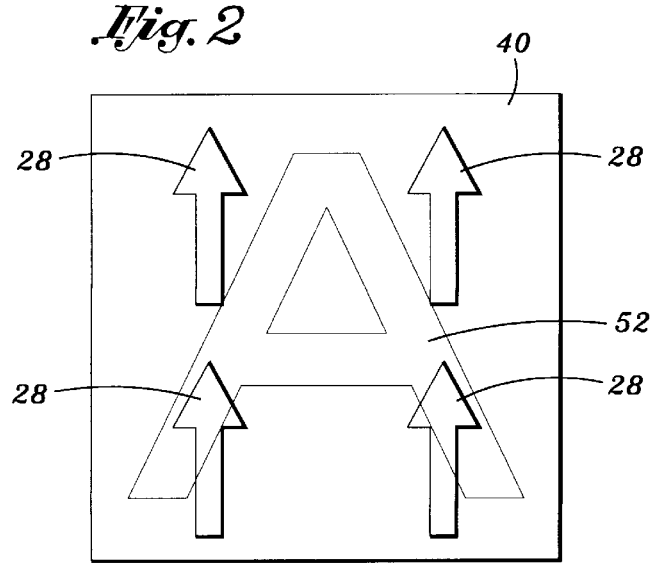
FIG. 2 is a front elevational view thereof taken along line 2 in FIG. 1.

As shown in FIG. 1, the video wall 10 is formed by a plurality of spatial object image display devices 20. Two pairs of spatial object image display devices 20 are preferably stacked to form a cube-shaped video wall 10. The front of the video wall 10 is covered with a semitransparent screen 40 that allows the first spatial object 28 to be projected through the semitransparent screen 40. The semitransparent screen 40 is preferably scrim, as described in Monroe, U.S. Pat. No. 5,257,130, hereby incorporated in full by reference. Those skilled in the art can devise suitable alternatives. Specifically, the prior art shows the use of a special diffused/transparent screen that is responsive to polarized light. The semitransparent screen 40 is preferably mounted over the lips 36 of the shrouds 34, the semitransparent screen 40 thereby covering the apertures 32 of all of the spatial object image display devices 20 and providing a projection screen upon which a projector 50 can project a second image 52. As shown in FIG. 2, the second image 52 serves to provide a background image for the first spatial objects 28. The combination of the second image 52 and the first spatial objects 28 appears to form a single three-dimensional image. The plurality of spatial object image display devices 20 produce a plurality of the first spatial objects 28, all of which can be different from each other, thereby producing a complex three-dimensional video image.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A video wall comprising:
   a plurality of spatial object image display devices, each device having:
      a luminous display screen for providing a first image;
      a lens operatively spaced apart from the luminous display screen for projecting the first image beyond the lens to appear as a first spatial object;
      a housing surrounding the luminous display screen and the lens, the housing allowing light only through an aperture, the lens being operably mounted in proximity to and substantially covering the aperture;
      a shroud extending from the perimeter of the aperture far enough to shield the lens, but not far enough to surround the first spatial object;
   each of the plurality of spatial object image display devices being operatively engaged with a video wall computer;
   the video wall computer being operatively engaged to at least one video input device; and
   a projector positioned to project a second image onto a semitransparent screen, the semitransparent screen being mounted over the shrouds and covering the apertures of the plurality of spatial object image display devices.

2. The apparatus of claim 1 wherein the luminous display screen is a television operably engaged with a video cassette recorder.

3. The apparatus of claim 1 wherein the lens is a Fresnel lens.

* * * * *